Patented Sept. 13, 1932

1,877,114

UNITED STATES PATENT OFFICE

WERNER ZERWECK, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING MONOHALOGEN DERIVATIVES OF NAPHTHOSTYRIL AND SUBSTITUTION PRODUCTS THEREOF

No Drawing. Application filed April 5, 1928, Serial No. 267,810, and in Germany April 9, 1927.

The subject matter of my invention is a process for manufacturing monohalogen derivatives of naphthostyril and substitution products thereof, corresponding probably to the general formula:

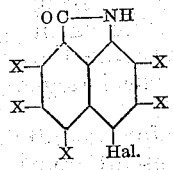

wherein the X's are hydrogen atoms of which one or more may be replaced by a monovalent substituent. This process consists in acting on naphthostyril and its nuclear substitution products in which the para-position to the NH-group is free with halogenating agents under such conditions that monohalogenated compounds are produced chiefly or exclusively. A main condition for obtaining the desired result is the use of halogenating agents in amounts not considerably above the theoretical quantity for introducing one halogen atom into the nucleus. As halogenating agents, free halogen or agents delivering halogen, for instance sulfurylchloride or a chlorate in the presence of hydrochloric-acid, may be used. Advantageously one works in the presence of a suitable diluent of an inorganic or organic character.

The uniform formation of monohalogen derivatives by my method is surprising, as it was not to be expected that the reaction could be stopped after the formation of the monohalogen derivative, since naphthalene compounds and especially naphthostyril are disposed to yield dihalogen derivatives.

The monohalogenated naphthostyril compounds could be prepared hitherto only in a complicated manner, i. e. by nitrating naphthostyril, reducing the nitro-body, thus formed, and converting the amino compound according to Sandmeyer's reaction into the corresponding halogen-derivative. By my process they are produced in a simple manner with an excellent yield and in a very pure state. They are important intermediates for the production of dyestuffs and pharmaceutical products.

In order to further illustrate my invention the following examples are given, the parts being by weight and all temperatures in Centigrade degrees; but I wish it to be understood that my invention is not limited to the examples given, nor to the exact conditions stated therein.

Example 1

169 parts of naphthostyril (obtainable for instance according to U. S. Patent No. 1,646,290) are dissolved in 2200 parts of concentrated sulfuric acid and mixed with 3 parts of iodine. Then chlorine is slowly passed through the solution at about 15–20° until a test shows that the reaction product has a melting point of about 260°. The mass is poured on ice and the precipitated 4-chloronaphthostyril is filtered off. When crystallized from glacial acetic acid, it represents yellow needles melting at 270° as stated by Eckstrand and corresponds probably to the formula:

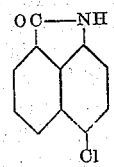

Example 2

169 parts of naphthostyril are dissolved, with heating, in 7000 parts of crude hydrochloric acid, then the solution is cooled down, whereby the hydrochloric salt of the naphthostyril separates. Into this suspension an aqueous solution of 40 parts of sodium chlorate is allowed to run slowly, while stirring, the temperature being advantageously kept at 15–20°. After stirring for some time, the residue is filtered off, washed and dried. The chloronaphthostyril, thus obtained in a nearly theoretical yield, is identical with the compound produced according to Example 1.

Example 3

15 parts of sulfuryl-chloride are slowly introduced at 50–60° into a solution of 17 parts of naphthostyril in 270 parts of tetrachloroethane. The temperature increases and the formed chloronaphthostyril is precipitated as yellow needles. After keeping the temperature at 50–60° for some time, the mass is cooled and the reaction product is filtered off and dried. In this manner the same product is obtained as described in the foregoing examples, melting without any purification at 265°.

Instead of tetrachloroethane other suitable dissolving or suspending agents may be used as glacial acetic acid, nitrobenzene, trichlorobenzene.

*Example 4*

10 parts of 5-ethoxy-naphthostyril, obtainable, for example, according to U. S. Patent No. 1,779,314, are dissolved in 200 parts of glacial acetic acid. A small quantity of iodine is added and 8 parts of sulfurylchloride are introduced at 50–60°. The resulting 4-chloro-5-ethoxy-naphthostyril corresponding probably to the formula:

separates from the hot solution as light yellow compact needles. When cold it is filtered off, washed with glacial acetic acid and water, and dried. It may be purified by dissolving it in hot glacial acetic acid and precipitating it therefrom by means of water. It melts at about 250–252°.

*Example 5*

To a solution of 169 parts of naphthostyril in 2700 parts of tetrachloroethane 0.5 parts of iodine are added and 176 parts of bromine are allowed to run in at 50–60°. The temperature increases and the hydrobromic salt of the monobromonaphthostyril separates as dark yellow crystals. The mass is maintained at 50–60° for some time and the reaction product is filtered off in the cold. By drying or treating with water the compound delivers hydrogen bromide and in a nearly quantitative yield monobromonaphthostyril is obtained as yellowish crystals melting at 256–257°.

It corresponds probably to the formula:

and is identical with the bromonaphthostyril prepared by Eckstrand in a complicated manner (Journal für praktische Chemie (2) vol. 38, page 173).

Instead of tetrachloroethane other suitable dissolving or suspending agents may be used such as glacial acetic acid, nitrobenzene, trichlorobenzene etc.

In the same manner the nuclear substitution products of naphthostyril yield nuclear substituted mono-bromonaphthostyrils.

I claim:

1. A process for manufacturing monohalogen derivatives of naphthostyril compounds corresponding probably to the general formula:

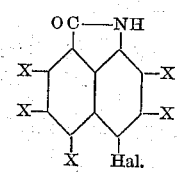

wherein the X's mean hydrogen atoms of which one may be replaced by an alkoxy group, which process comprises treating a naphthostyril compound in which the para-position to the iminogroup is free with a nuclear halogenating agent in amounts not considerably above the theoretical quantity for introducing one halogen atom into the nucleus.

2. A process for manufacturing monochloro derivatives of naphthostyril compounds corresponding probably to the general formula:

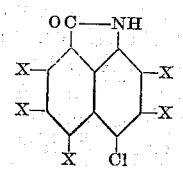

wherein the X's mean hydrogen atoms of which one may be replaced by an alkoxy group, which process comprises treating a naphthostyril compound in which the para-position to the imino-group is free with a nuclear chlorinating agent in amounts not considerably above the theroretical quantity for introducing one chlorine atom into the nucleus.

3. As a new product the 4-chloro-5-ethoxynaphthostyril corresponding probably to the formula:

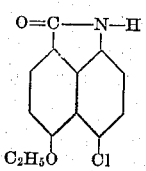

which product represents light yellow compact needles melting at about 250–252°, soluble in organic solvents, insoluble in water.

In testimony whereof, I affix my signature.

WERNER ZERWECK.